US006382257B2

(12) United States Patent
Mead et al.

(10) Patent No.: US 6,382,257 B2
(45) Date of Patent: May 7, 2002

(54) FLUID CONTROL SYSTEM

(75) Inventors: Marcus Mead; Gary Alan Shaw; Alan Paul Ross, all of Cornwall (GB)

(73) Assignee: Parker-Hannifin PLC, Hemel Hempstead (GB)

( * ) Notice: Subject to any disclaimer, the term of this patent is extended or adjusted under 35 U.S.C. 154(b) by 0 days.

(21) Appl. No.: 09/886,882

(22) Filed: Jun. 21, 2001

Related U.S. Application Data

(63) Continuation of application No. PCT/GB00/04065, filed on Oct. 20, 2000.

(30) Foreign Application Priority Data

Oct. 20, 1999 (EP) ........................................... 99308252

(51) Int. Cl.[7] ............................................... F16K 27/00
(52) U.S. Cl. .......................... 137/884; 700/11; 700/282
(58) Field of Search ............................ 137/884, 624.11; 700/3, 11, 19, 20, 282

(56) References Cited

U.S. PATENT DOCUMENTS

| | | | | | |
|---|---|---|---|---|---|
| 4,854,346 A | | 8/1989 | Nakanishi et al. | |
| 5,519,636 A | * | 5/1996 | Stoll et al. | 364/505 |
| 5,522,431 A | | 6/1996 | Bonacorsi et al. | |
| 5,601,415 A | | 2/1997 | Nagai et al. | |
| 6,047,222 A | * | 4/2000 | Burns et al. | 700/79 |
| 6,069,926 A | * | 5/2000 | Sekiya et al. | 375/357 |
| 6,192,281 B1 | * | 2/2001 | Brown et al. | 700/2 |

FOREIGN PATENT DOCUMENTS

| | | |
|---|---|---|
| DE | 198 01 234 A1 | 7/1999 |
| EP | 0 299 655 A1 | 1/1989 |
| EP | 0 493 972 A2 | 7/1992 |
| EP | 1 094 228 A1 | 4/2001 |
| JP | 08 101 704 | 4/1996 |
| JP | 10 213259 | 8/1998 |

OTHER PUBLICATIONS

Copy of International Application No. WO01/29431 published under the Patent Cooperation Treaty.

* cited by examiner

*Primary Examiner*—John Fox
(74) *Attorney, Agent, or Firm*—Christopher H. Hunter

(57) ABSTRACT

A modular fluid control system, comprising: a control module for receiving parallel electronic control signals as a plurality of data streams, the control module including a control unit configured to convert the data streams of the parallel electronic control signals to serial electronic control signals, each including a plurality of data pulses as control instruction signals, and an electrical connector; a plurality of valve modules, each valve module including at least one valve operable to control the flow of pressurized fluid; and a plurality of manifold modules connectable in series to the control module and connected to respective ones of the valve modules, each manifold module including a fluid supply conduit to provide a common manifold for receiving pressurized fluid, first and second electrical connectors for connection with ones of the connectors of adjacent manifold modules and the connector of the control module to provide an electrical bus for transmission of the serial control signals and power supply, and a control unit configured to decode one or more of the first-received data pulses of the serial control signals, control the respective valve module accordingly, and pass any remaining data pulses as a modified serial control signal from which the decoded data pulses have been one of removed or blocked to the control unit of any downstream manifold module.

20 Claims, 7 Drawing Sheets

FLUID CONTROL SYSTEM

RELATED CASES

This application is a continuation of and claims priority to International Application No. PCTGB00/04065, filed Oct. 20, 2000, which designated the United States, and which is incorporated herein by reference, and which claims priority to European Patent Application No. 99308252.8, filed Oct. 20, 1999.

BACKGROUND OF THE INVENTION

The present invention relates to a fluid control system, and in particular to a modular, valve-operated fluid control system. In many industrial applications, it is necessary to provide a large number of individually-controllable pneumatic or hydraulic fluid lines. In practice, this requires at least one electronically-operated solenoid valve to be provided for each fluid line. Rather than provide each valve with its own power and control leads, which would be impractical, it is known to connect all of the solenoid valves to a single power supply, provide a common data bus on which control signals are transmitted, and provide each valve with a controller for interpreting the control signals and operating the valve as required. EP-A-0299655 discloses one example of such a fluid control system.

Such fluid control systems are generally complex, requiring elaborate control protocols and data decoders within the valve controllers to derive the specific instructions for each valve. In addition, it is usually necessary to provide each valve with a unique pre-set address or means for setting a unique address, such as a position encoder, to enable instructions to be transmitted to particular valves. This requirement introduces further complexity and leads to problems if addresses become non-unique. Furthermore, although some of the fluid control systems of the above-described kind may be described as "modular", for example, the system disclosed in U.S. Pat. No. 5,522,431 in which a common fluid manifold is provided by combining a plurality of separate manifold modules, those systems do not allow simple system construction or system expansion. Those systems, which are sold through a distributor, are pre-configured by the manufacturer according to a particular specification. As such, those systems do not allow for alteration by adding or removing valves without the need for substantial re-adjustment or system re-wiring/re-programming.

SUMMARY OF THE INVENTION

It is thus an aim of the present invention to provide a modular fluid control system which can be easily configured, typically by distributors, by simply fitting together the required components in the desired configuration from a small range of different standard modules, and which, when powered up, is fully configured and ready for operation without the need for additional complicated wiring.

Accordingly, the present invention provides a modular fluid control system, comprising: a control module for receiving parallel electronic control signals as a plurality of data streams, the control module including a control unit configured to convert the data streams of the parallel electronic control signals to serial electronic control signals, each including a plurality of data pulses as control instruction signals, and an electrical connector; a plurality of valve modules, each valve module including at least one valve operable to control the flow of pressurized fluid; and a plurality of manifold modules connectable in series to the control module and connected to respective ones of the valve modules, each manifold module including a fluid supply conduit to provide a common manifold for receiving pressurized fluid, first and second electrical connectors for connection with ones of the connectors of adjacent manifold modules and the connector of the control module to provide an electrical bus for transmission of the serial control signals and power supply, and a control unit configured to decode one or more of the first-received data pulses of the serial control signals, control the respective valve module accordingly, and pass any remaining data pulses as a modified serial control signal from which the decoded data pulses have been one of removed or blocked to the control unit of any downstream manifold module.

Preferably, the manifold modules are non-addressed.

In one embodiment the control system comprises a single group of series-connected manifold modules.

In another embodiment the control system comprises a plurality of interconnected groups of series-connected manifold modules, and further comprises intermediate connection modules connected to the intermediate ends of the groups of manifold modules.

Preferably, the control system further comprises an end connection module connected to the end of the series-connected manifold modules.

Preferably, one of the control module or the end connection module includes a port for connection to a supply of pressurised fluid.

Preferably, the serial control signals are pulse width modulated signals.

More preferably, data pulses having different pulse widths designate different control states.

Yet more preferably, the pulse widths are the active pulse widths.

Preferably, the control unit of each manifold module is further configured to operate the respective valve module only on consecutively receiving the one or more data pulses having the same pulse widths a predetermined number of times.

More preferably, the control unit of each manifold module is configured to operate the respective valve module only on consecutively receiving the one or more data pulses having the same pulse widths at least three times.

Preferably, the valve modules include one of mono-stable or bi-stable valves.

More preferably, the control unit of any manifold module connected to a valve module including a mono-stable valve is configured to decode the first-received data pulse of each of the received serial control signals.

More preferably, the control unit of any manifold module connected to a valve module including a bi-stable valve is configured to decode the first- and second-received data pulses of each of the received serial control signals.

Preferably, the control unit of the control module is further configured to terminate each of the serial control signals generated thereby with a termination signal to denote the end of each of the serial control signals.

Preferably, the control unit of each manifold module is further configured to transmit return data signals to the control module.

More preferably, the control unit of each manifold module is configured to transmit return data signals to the control module on receipt of the termination signal.

More preferably, the control unit of the control module is further configured to convert the return data signals to parallel return data signals.

Preferably, the manifold modules each comprise a body which includes a passage, and a printed circuit board housed in the passage which includes the connectors and the control unit, with the passages together defining a common passage in which the printed circuit boards are connected.

Preferably, the main body of each manifold module is formed as an integral component.

The fluid control system of the present invention, in being simple and requiring no re-wiring of the component parts, allows for configuration by non-skilled technicians, thus allowing for configuration by parties other than the manufacturer, such as a distributor.

In its preferred embodiments the fluid control system of the present invention automatically provides a "virtual connection" between valve modules at any given location with reference to the respective pin or pins of the external connector. In the event that alteration of the configuration of the system is required, the system may be quickly disassembled, manifold modules and associated valve modules added, removed or re-arranged and then re-assembled. The new positions of the re-arranged valve modules will automatically correspond to the correct pin or pins of the external connector without the need to re-wire the system.

DETAILED DESCRIPTION OF THE PREFERRED EMBODIMENT

FIGS. 1 to 6 relate to a fluid control system in accordance with a first embodiment of the present invention.

Figure 1:
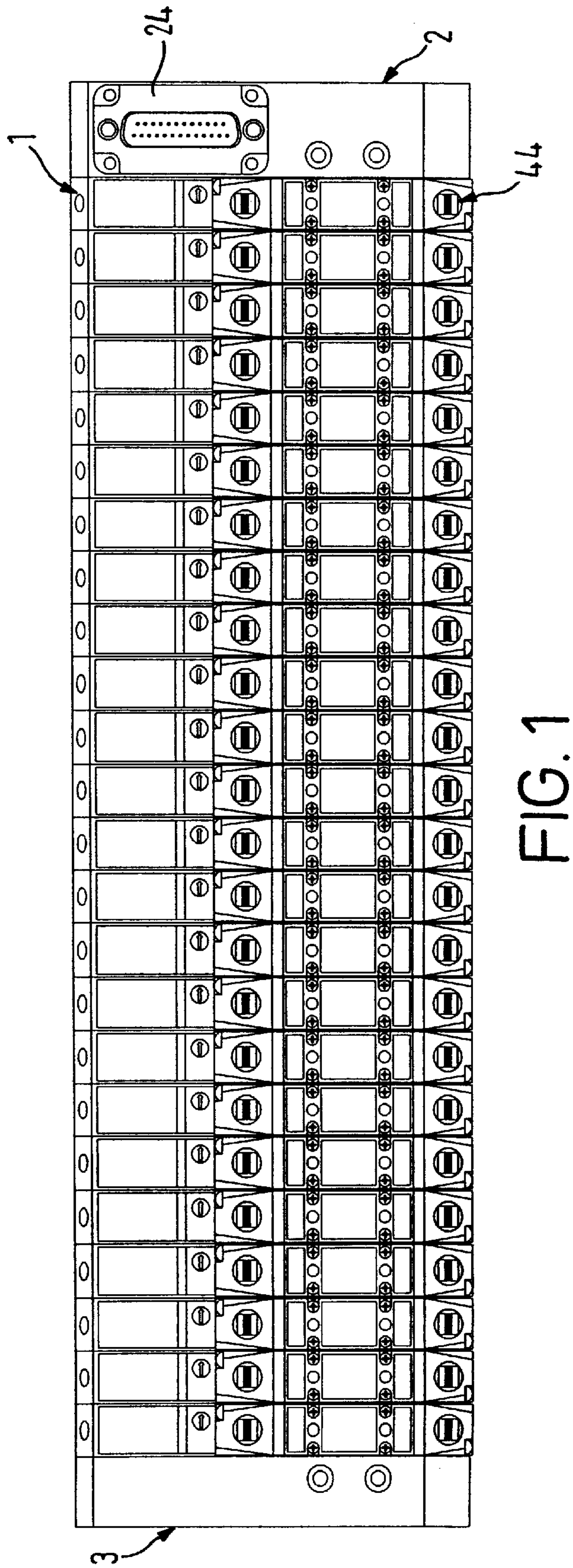
FIG. 1 illustrates a front view of a fluid control system in accordance with a first embodiment of the present invention.
Figure 2:
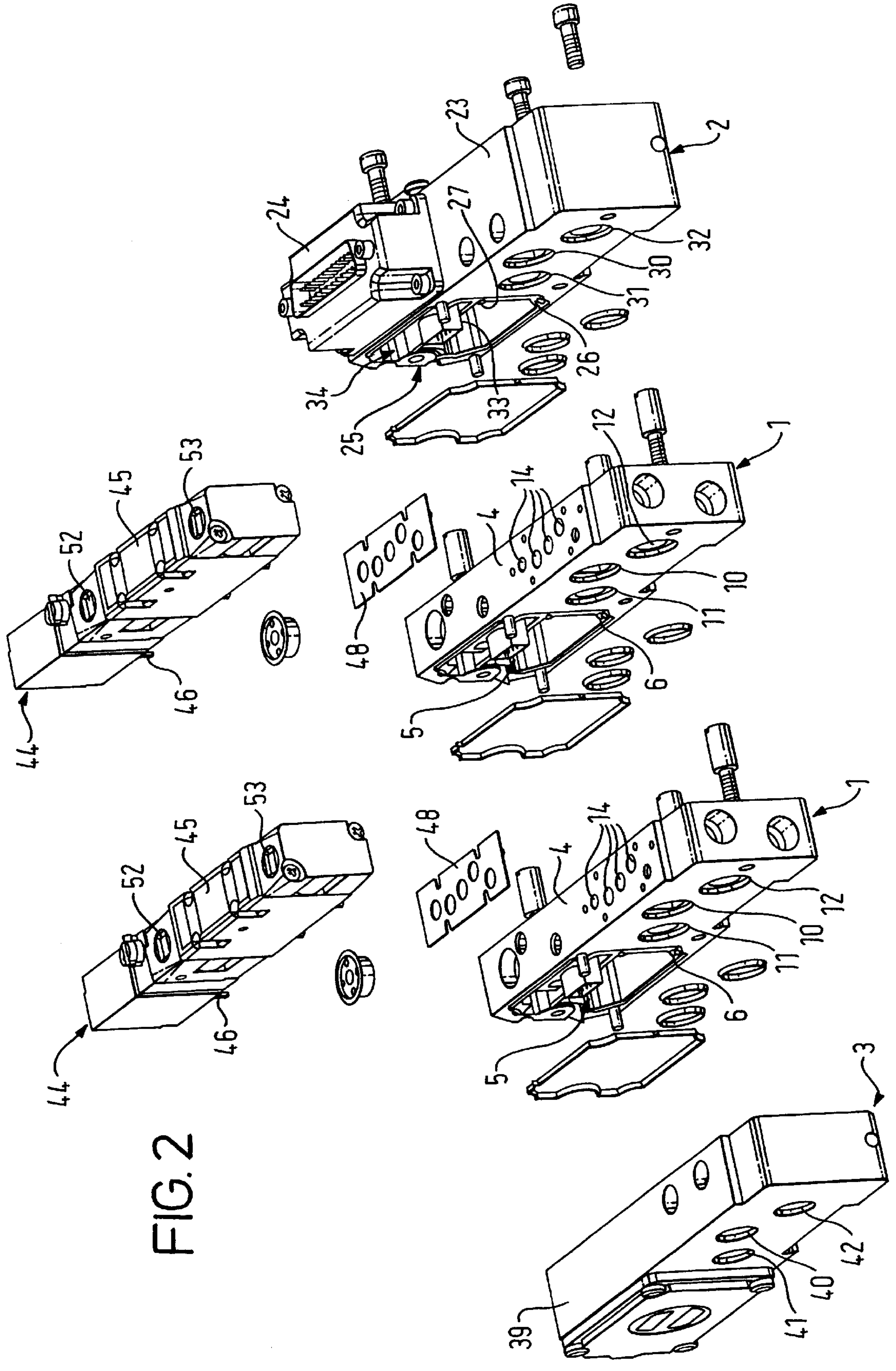
FIG. 2 illustrates an exploded perspective view of the control system of FIG. 1, illustrating only two of the manifold modules and associated valve modules.

With particular reference to FIG. 2, the control system is built up from a plurality of, in this embodiment twenty-four, series-connected manifold modules 1 each having an associated valve module 44, a control module 2 at one end of the series-connected manifold modules 1, and an end connection module 3 at the other end of the series-connected manifold modules 1. The control system may, for example, be a pneumatic or hydraulic system in which a pressurised fluid, such as air or oil, is supplied and channelled through the manifold modules 1. For ease of illustration, only two manifold modules 1 and associated valve modules 44 are illustrated in FIG. 2. This embodiment enables the inclusion of up to twenty-four manifold modules 1 and associated valve modules 44, but it should be understood that, by modification of the control module 2 to include further inputs, further manifold modules 1 and associated valve modules 44 could be accommodated.

Figure 3:
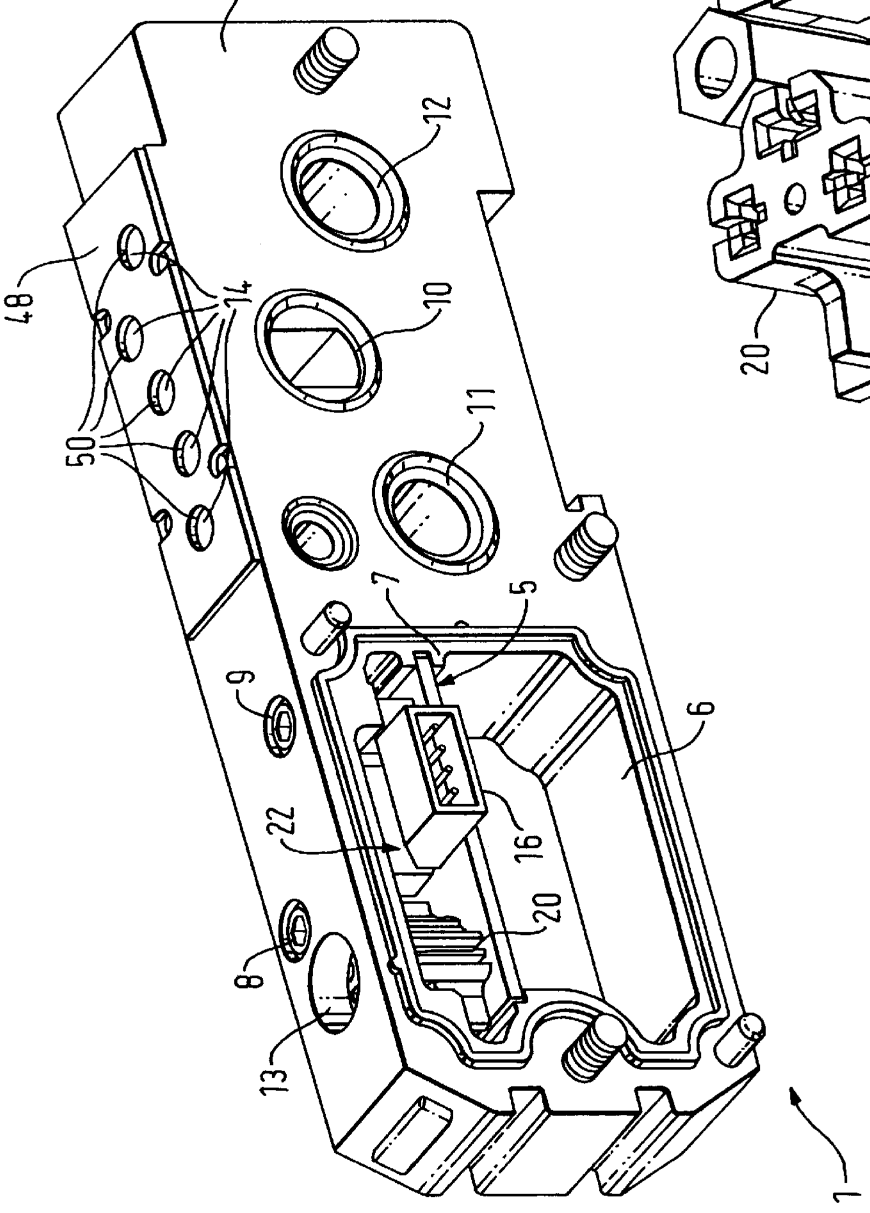
FIG. 3 illustrates a perspective view of one of the manifold modules of the control system of FIG. 1.
Figure 4:
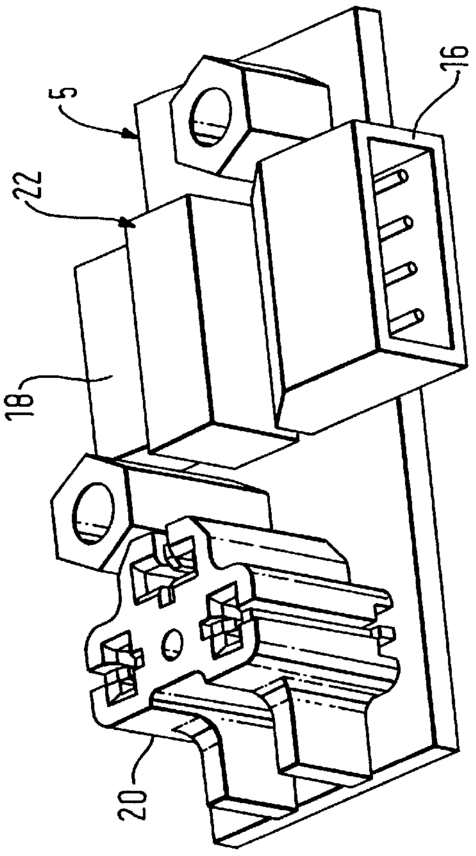
FIG. 4 illustrates a perspective view of the circuit board of the manifold module of FIG. 3.

With particular reference to FIG. 3, the construction of each manifold module 1 will now be described hereinbelow.

Each of the manifold modules 1 comprises a main body 4 and a circuit board 5 mounted therein. In this embodiment the main body 4 is extruded or die cast from an aluminium alloy, but alternatively could be formed from an injection-moulded plastics material.

The main body 4 includes a passage 6 which extends completely therethrough from one to the other side surface thereof. The passage 6 includes mounting means 7, in this embodiment recesses, for mounting the circuit board 5, with the circuit board 5 being secured within the passage 6 by fixing means 8, 9, preferably bolts, tapped screws or dowel pins.

The main body 4 further includes a fluid conduit 10 and first and second exhaust conduits 11, 12, which conduits 10, 11, 12 each extend completely therethrough from the one to the other side surface thereof, a connection aperture 13 in the upper surface thereof for providing a means of connection to the circuit board 5, and a plurality of valve orifices 14 in the upper surface thereof which are in fluid communication with selected ones of the fluid conduit 10 and the exhaust conduits 11, 12. As illustrated in FIG. 2, the manifold modules 1 are connected together so as to define a common manifold in which the passages 6, the fluid conduits 10 and the exhaust conduits 11, 12 are each commonly connected.

The circuit board 5 includes first and second electrical connectors 16, 18, in this embodiment four-pin male and female connectors, for connection to the counterpart connectors 16, 18, 33 of adjacent ones of the manifold modules 1 and the control module 2 so as to provide a common bus for two-way data transmission and power supply through each of the manifold modules 1, and a third electrical connector 20, in this embodiment a female three-pin connector, for providing a means of electrical connection to an associated valve module 44 through the connection aperture 13 in the main body 4.

The circuit board 5 further includes a control unit 22, in this embodiment including a microprocessor, which is, inter alia, configured to receive and decode control instruction signals, in this embodiment data pulses, from serial control signals, in this embodiment serial data streams, as output by the control module 2 over the common data bus, and control the associated valve module 44 accordingly. The serial data is pulse width modulated according to a predetermined communication protocol, with a first active pulse width, in this embodiment 15 $\mu$s, being the ON code, a second active pulse width, in this embodiment 9 $\mu$s, being the OFF code, a third, short active pulse width, in this embodiment 4 $\mu$s, being the STOP code, and the inter-pulse gaps being adjusted to maintain a uniform period, in this embodiment 20 $\mu$s, between the leading pulse edges.

In this embodiment, the serial data is transmitted in negative logic, with an active pulse being at 0 V and an inactive pulse being at +5 V. The control unit 22 is further configured, where required, to transmit return data, for example, error codes or state information, for the respective manifold module 1 and associated valve module 44 back to the control module 2 on receiving the STOP code, in this embodiment a short pulse having an active pulse width of 4 μs, with the return data being transmitted back to the control module 2 through each of the control units 22. The return data is formatted so as to identify the originating control unit 22, in this embodiment by inclusion in a specific time slot reserved for the respective manifold module 1 and associated valve module 44 within a time window, in this embodiment a period of 100 μs, subsequent to receiving the short pulse of the STOP code.

In this embodiment the control unit 22 has two different versions, one for controlling a mono-stable solenoid valve and the other for controlling a bi-stable solenoid valve. As is well understood by a person skilled in the art, a mono-stable solenoid valve is a solenoid valve which is switchable from an de-activated state to an activated state and requires power to maintain the activated state, and a bi-stable solenoid valve is a solenoid valve which is switchable between two states and does not require power to remain in either state.

The mono-stable control unit 22 is configured to decode the first-received data pulse in any received data stream, and then gate the subsequent data pulses of that one data stream to the control unit 22 of the downstream manifold module 1. Where multiple, in this embodiment three, consecutive data pulses having the same active pulse width, that is, data pulses having an active pulse width of 15 μs (ON code) or 9 μs (OFF code), are decoded, the control unit 22 is configured to activate or de-activate the solenoid valve of the associated valve module 44. The control unit 22 operates the associated valve module 44 only on receiving consecutively multiple data pulses having the same active pulse width in order to prevent noise in the control signal causing the inadvertent activation or de-activation of the solenoid valve.

The bi-stable control unit 22 is configured to decode the first- and second-received data pulses in any received data stream, and then gate the subsequent data pulses of that one data stream to the control unit 22 of the downstream manifold module 1. Where multiple, in this embodiment three, consecutive pairs of data pulses having the same active pulse widths, that is, pairs of data pulses having active pulse widths of one of 15 μs (ON code) and 9 μs (OFF code) or 9 μs (OFF code) and 15 μs (ON code), are decoded, the control unit 22 is configured to switch the solenoid valve of the associated valve module 44 to the respective one of the two directional states. For the same reason as given hereinabove, the control unit 22 operates the associated valve module 44 only on receiving consecutively multiple pairs of data pulses having the same active pulse widths in order to prevent noise in the control signal causing the inadvertent switching of the solenoid valve.

The control module 2 comprises a main body 23, an electrical connector 24 mounted to the main body 23 and electrically connected in use to an external programmable control device, and a circuit board 25 mounted in the main body 23 and electrically connected to the connector 24. In this embodiment the main body 23 is extruded or die cast from an aluminium alloy, but alternatively could be formed from an injection-moulded plastics material.

The main body 23 is of similar design to the main bodies 4 of the manifold modules 1 in including a cavity 26 which includes mounting means 27, in this embodiment recesses, for mounting the circuit board 25, with the circuit board 25 being secured within the cavity 26 by fixing means, preferably bolts, tapped screws or dowel pins.

The main body 23 further includes a fluid conduit 30 and first and second exhaust conduits 31, 32 which are in fluid communication with the respective ones of the fluid conduits 10 and the first and second exhaust conduits 11, 12 in the main bodies 4 of the manifold modules 1.

The connector 24, in this embodiment a 25-way electrical connector, is configured to receive in parallel twenty-four control signals, in this embodiment at +24 V, on respective ones of the pins thereof, with the remaining pin providing a common ground line, in this embodiment a common return at 0 V.

The circuit board 25 includes an electrical connector 33, in this embodiment a four-pin male connector, for connection to the counterpart connector 18 of the circuit board 5 of the adjacent manifold module 1. The pins of the connector 33 provide a common ground line (0 V), a power line (+24 V), a serial signal input line and a serial signal output line. As will become apparent hereinbelow, where only one-way data communication from the control module 2 to the manifold modules 1 is required, then the connector 33 on the circuit board 25 of the control module 2 and the connectors 16, 18 on the circuit boards 5 of the manifold modules 1 need only have three pins as only one data line is required.

Figure 5:
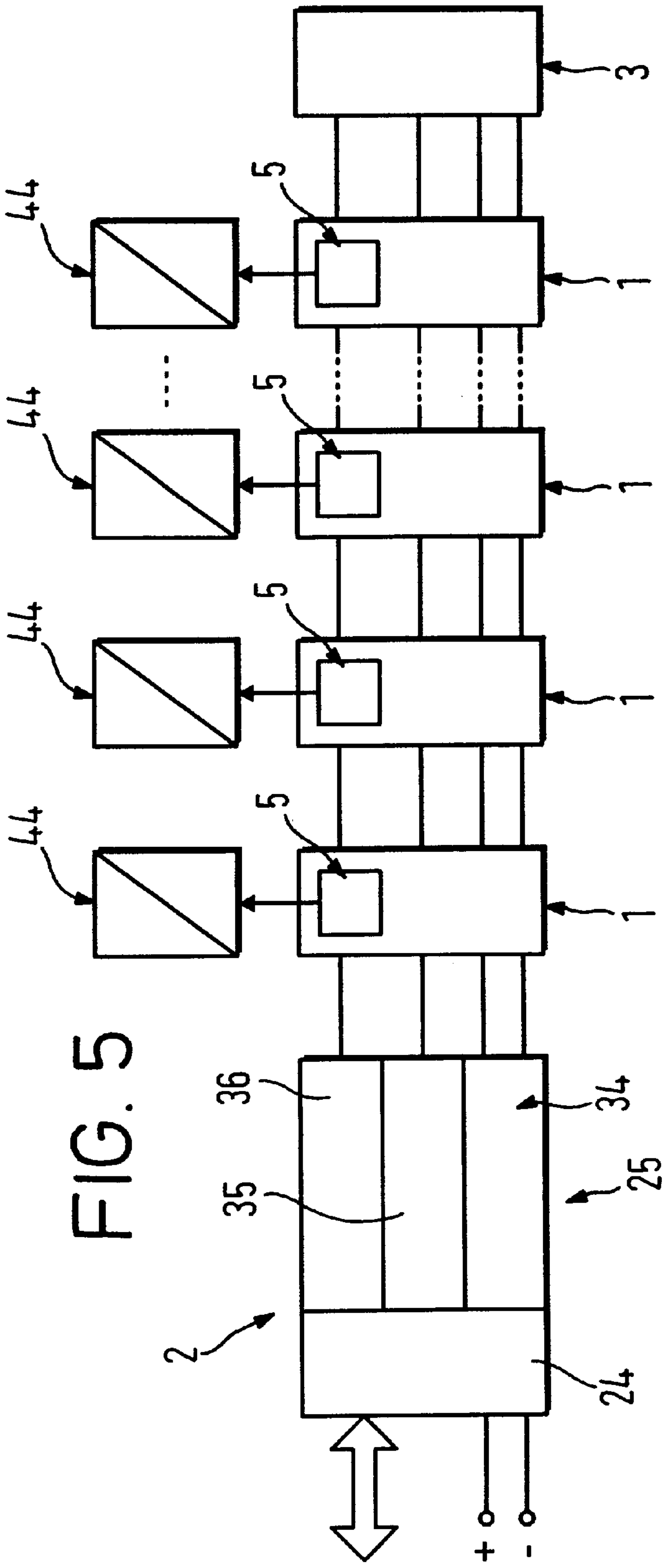
FIG. 5 schematically illustrates the electrical connections of the control system of FIG. 1.

With reference to FIG. 5, the circuit board 25 further includes a control unit 34 which includes a parallel-to-serial converter 35 for converting parallel control signals, in this embodiment twenty-four parallel data streams at +24 V, received via the connector 24 from the external control device to serial control signals, in this embodiment 5 V serial data streams including twenty-four pulse width modulated data pulses, for transmission to the manifold modules 1 over the common data bus, and a serial-to-parallel converter 36 for converting serial return data signals, in this embodiment twenty-four 5 V pulse width modulated data pulses, received from the manifold modules 1 to parallel return data signals, in this embodiment twenty-four parallel data streams at +24 V, for transmission over the common data bus and via the connector 24 to the external control device.

In this embodiment, the parallel-to-serial and serial-to-parallel converters 35, 36 are each provided by a 24-bit shift register and a microprocessor. The control unit 34 is further configured to terminate each serial control signal with the short pulse of the STOP code, in this embodiment having an active pulse width of 4 μs, to confirm completion of the transmission of the serial control signal to the control units 22 of the manifold modules 1. It will be understood that where only one-way data transmission to the manifold modules 1 is required, the control unit 34 need not include the serial-to-parallel converter 36.

Figure 6:
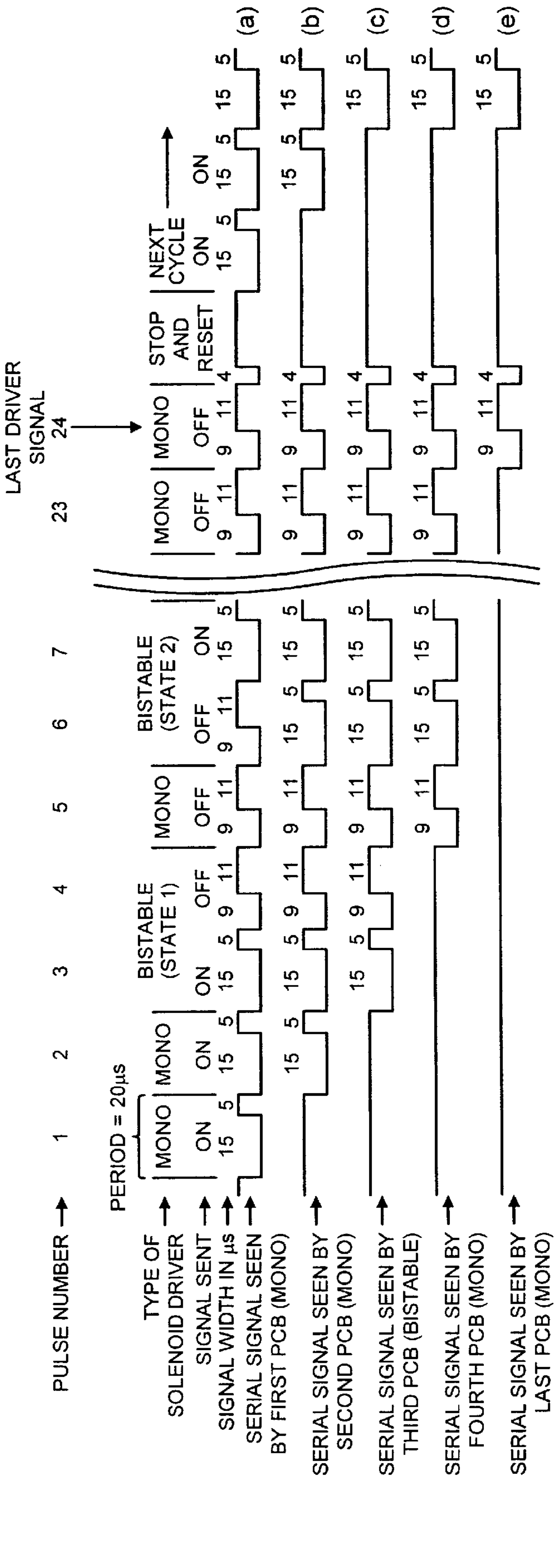
FIG. 6 illustrates the timing diagram of a representative serial control signal as output by the control unit of the control module and operated upon by the control units of the manifold modules of the control system of FIG. 1.

FIG. 6(*a*) illustrates a representative example of the format of a serial control signal generated by the control unit 34 of the control module 2 for operation of the control system when including twenty-two manifold modules 1 and associated valve modules 44, with the third and fifth manifold modules 1 including bi-stable control units 22 for control of the associated valve modules 44 including bi-stable valves and the other manifold modules 1 including mono-stable control units 22 for control of the associated valve modules 44 including mono-stable valves. FIGS. 6(*b*) to (*e*) illustrate the format of that same control signal as received by the control units 22 of the second, third, fourth and twenty-second (last) manifold modules 1. As will be noted, the non-decoded data pulses are gated to the control unit 22 of the subsequent manifold module 1. In this way, addressing of the manifold modules 1 is unnecessary. All that is required is that the external control device be programmed with the functionality and position of the respective types of the manifold modules 1.

The end connection module 3 comprises a main body 39 which is of similar design to the main bodies 4 of the manifold modules 1 and includes a fluid conduit 40 and first and second exhaust conduits 41, 42 which are in fluid communication with the respective ones of the fluid conduits 10 and the first and second exhaust conduits 11, 12 in the main bodies 4 of the manifold modules 1. In this embodiment a pressurised fluid supply line is connected to the fluid supply conduit 40 and exhaust lines are connected to the exhaust conduits 41, 42. In an alternative embodiment, the pressurised fluid supply line could be connected to the fluid supply conduit 30 in the control module 2 and the exhaust lines could be connected to the exhaust conduits 31, 32 in the control module 2.

The control system further comprises a plurality of, in this embodiment twenty-four, valve modules 44, each connected to a respective one of the manifold modules 1.

The valve modules 44 each comprise a main body 45, an electrical connector 46, in this embodiment a male connector, mounted to the main body 45 and electrically connected to the third connector 20 on the circuit board 5 of the respective manifold module 1, and at least one electrically-operated valve, in this embodiment a solenoid valve, which is powered through the connector 46. As mentioned hereinabove, the at least one valve may be either a mono-stable or bi-stable solenoid valve, and where a bi-stable valve is incorporated in any of the valve modules 44, two pins of the connector 24 of the control module 2 are required for each bi-stable valve.

The main body 45 includes a plurality of orifices which are in registration with the orifices 14 in the main bodies 4 of the respective manifold bodies 1 and act as supply and exhaust ports. In this embodiment a valve interface plate 48, preferably a rubber gasket, is located between the main bodies 4, 45 of the manifold modules 1 and the valve modules 44, with the valve interface plates 48 including a plurality of through holes 50 in registration with the orifices 14 in the main bodies 4 of the manifold modules 1 and the orifices in the valve modules 44.

The main body 45 further includes first and second fluid outlet ports 52, 53 which are connected to fluid supply lines for supplying flow-controlled pressurised fluid to external equipment.

In use, manifold modules 1 each with an associated valve module 44, the control module 2, and the end connection module 3 are built up to provide a fluid control system as described above, and connected to an external control device, typically a programmable logic controller (PLC), through the connector 24 of the control module 2. Once powered up, the control system is ready for use without the need to individually set unique addresses for each of the manifold modules 1. Indeed, the control system is so versatile as to allow manifold modules 1 to be added or removed without requiring any re-wiring or complex programming modifications. This versatility stems from the manner in which the control signals are transmitted from the control module 2 to the manifold modules 1 as described hereinabove.

As described hereinabove, the operation of each of the valves of the valve modules 44 is controlled in response to parallel control signals, in this embodiment one per valve module, as generated by the external control device. Upon receipt of the parallel control signals, the control unit 34 in the control module 2 converts the parallel control signals into serial control signals in a time-divided, multiplexed fashion and transmits the same to the manifold modules 1 over the common data bus. In this embodiment the serial control signal output by the control unit 34 in the control module 2 is a serial data stream including twenty-four consecutive data pulses, each providing the ON or OFF code control instructions for the valve modules 44, and a terminating pulse providing the STOP code.

Following the format of the serial control signal illustrated in FIG. 6(*a*), the control unit 22 of the first manifold module 1 acts on the first data pulse of the serial control signal output by the control unit 34 of the control module 2 to control the associated valve module 44 and modifies the serial control signal by one of removing or blocking the first data pulse, in this embodiment by gating the subsequent data pulses. The control unit 22 of the second manifold module 1 then acts on the first data pulse of the modified serial control signal, that is, the second data pulse of the serial control signal as originally output by the control unit 34 of the control module 2, and modifies the serial control signal by one of removing or blocking the first-received data pulse, in this embodiment by gating the subsequent data pulses.

The control unit 22 of the third manifold module 1 then acts on the first and second data pulses of the modified serial control signal, that is, the third and fourth data pulses of the serial control signal as originally output by the control unit 34 of the control module 2, and modifies the serial control signal by one of removing or blocking the first and second-received data pulses, in this embodiment by gating the subsequent data pulses. The control unit 22 of the fourth manifold module 1 then acts on the first data pulse of the modified serial control signal, that is, the fifth data pulse of the serial control signal as originally output by the control unit 34 of the control module 2, and modifies the serial control signal by one of removing or blocking the first-received data pulse, in this embodiment by gating the subsequent data pulses. The control unit 22 of the fifth manifold module 1 then acts on the first and second data pulses of the modified serial control signal, that is, the sixth and seventh data pulses of the serial control signal as originally output by the control unit 34 of the control module 2, and modifies the serial control signal by one of removing or blocking the first- and second-received data pulses, in this embodiment by gating the subsequent data pulses. The control units 22 of the sixth to twenty-first manifold modules 1 similarly act on and modify the serial control signal, until finally the control unit 22 of the twenty-second manifold module 1 acts on the one remaining data pulse, that is, the twenty-fourth data pulse of the originally-transmitted serial control signal.

A short terminating pulse representing the STOP code, in this embodiment having an active pulse width of 4 μs, is received by each of the control units 22 which confirms completion of the transmission of the serial control signal- and triggers transmission of return data, for example, error codes or state information, from each of the manifold modules 1 back to the control module 2, and readies the control units 22 for receipt of the next serial control signal. In another embodiment, at the end of the predetermined period set aside for the transmission of the return data, in this embodiment a period of 100 μs, the control unit 34 of the control module 2 can be configured to transmit a further short pulse, typically having an active pulse width of 1 or 2 μs, to ready the control units 22 of the manifold modules 1 for receipt of the next serial control signal.

Figure 7:
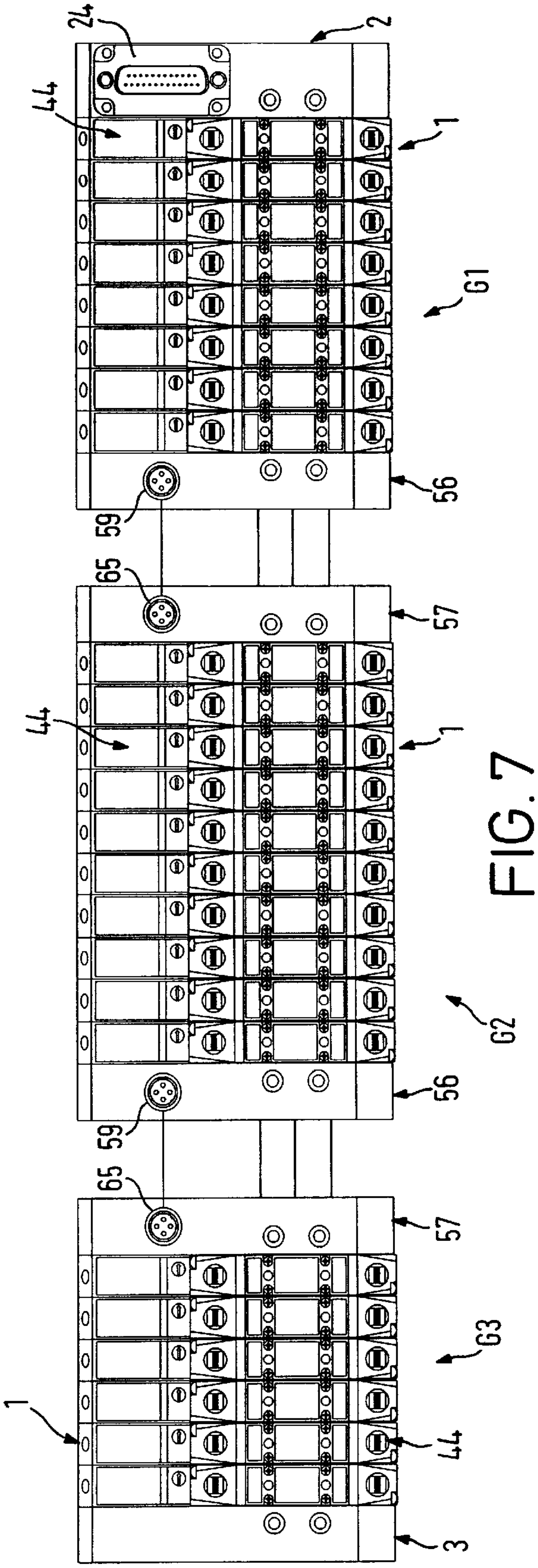
FIG. 7 illustrates a front view of a fluid control system in accordance with a second embodiment of the present invention.
Figure 9:
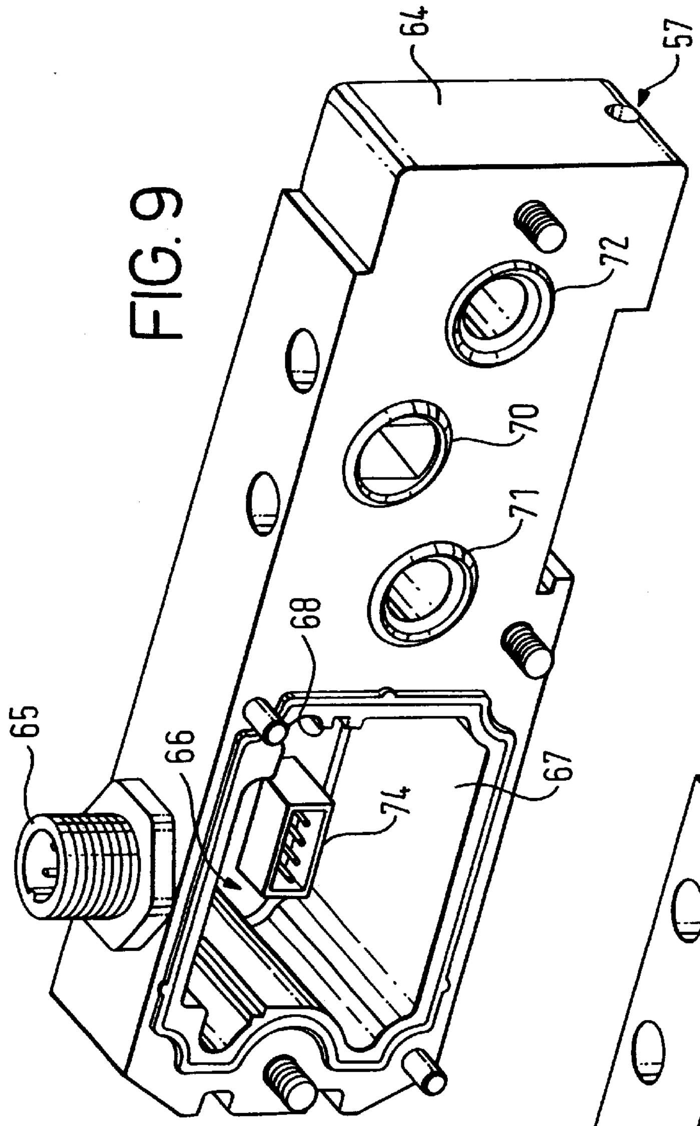
FIG. 9 illustrates a perspective view of one intermediate input connection module of the control system of FIG. 7.
Figure 8:
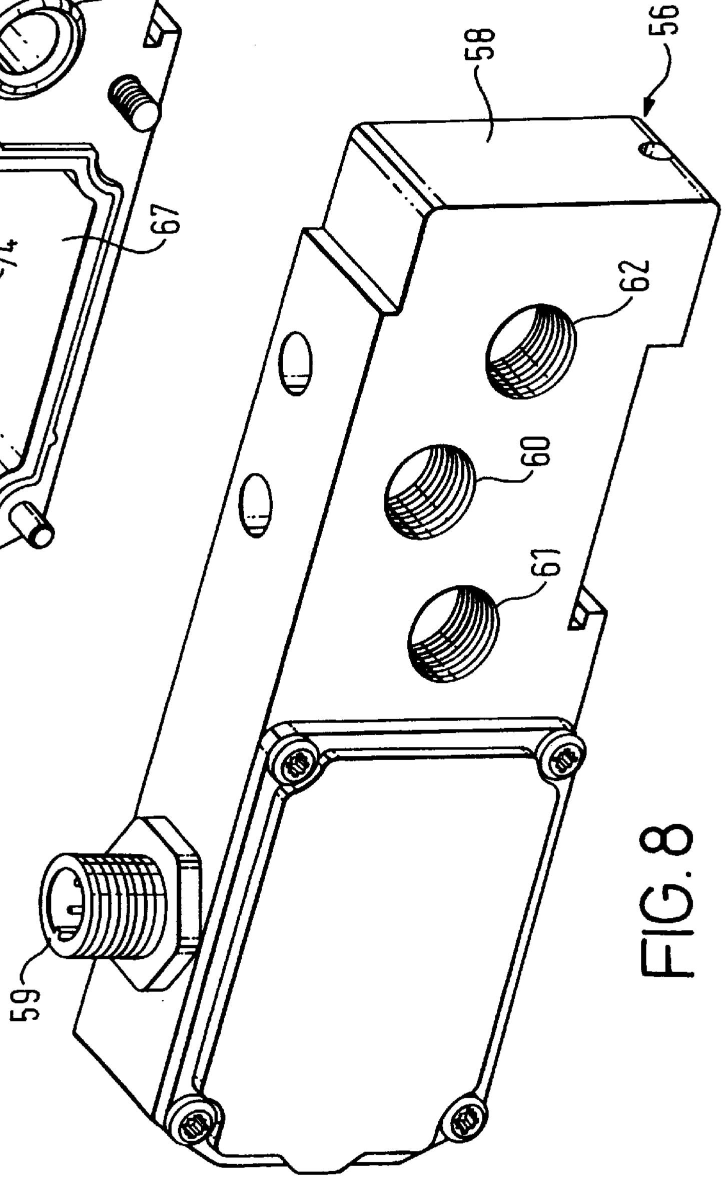
FIG. 8 illustrates a perspective view of one intermediate output connection module of the control system of FIG. 7.

FIGS. 7 to 9 relate to a fluid control system in accordance with a second embodiment of the present invention.

The fluid control system of this embodiment is broadly similar to the fluid control system of the above-described embodiment. Thus, in order to avoid unnecessary duplication of description, only the differences will be described in detail, with like parts being designated by like reference signs.

The fluid control system differs in that the manifold modules 1 are provided as three daisy-chained groups G1, G2, G3 of serially-connected manifold modules 1, with the intermediate ends of the groups G1, G2, G3 including respective ones of intermediate output connection modules 56 and intermediate input connection modules 57. Such daisy-chained groups G1, G2, G3 of manifold modules 1 would typically be provided at separate locations within a factory or industrial plant.

Each of the intermediate output modules 56 comprises a main body 58, an electrical connector 59 mounted to the main body 58 and electrically connected to the electrical connector 65 of the subsequent intermediate input module 57, and a circuit board mounted in the main body 58 and connected to the connector 59. In this embodiment the main body 58 is extruded or die cast from an aluminium alloy, but alternatively could be formed from an injection-moulded plastics material.

The main body 58 of the intermediate output module 56 is of similar design to the main bodies 4 of the manifold modules 1 in including a cavity which includes mounting means, in this embodiment recesses, for mounting the circuit board, with the circuit board being secured within the cavity by fixing means, preferably bolts, tapped screws or dowel pins.

The main body 58 further includes a fluid conduit 60 and first and second exhaust conduits 61, 62 which are in fluid communication with the respective ones of the fluid conduits 10 and the first and second exhaust conduits 11, 12 in the main bodies 4 of the manifold modules 1.

The circuit board includes an electrical connector, in this embodiment a four-pin female connector, for connection to the counterpart connector 16 of the circuit board 5 of the adjacent manifold module 1. The pins of the connector provide a common ground line (0 V), a power line (+24 V), a serial signal input line and a serial signal output line. As mentioned hereinabove, where only one-way data communication from the control module 2 to the manifold modules 1 is required, then the connector on the circuit board and the connector 59 on the main body 58 need only have three sockets or pins.

Each of the intermediate input modules 57 comprises a main body 64, an electrical connector 65 mounted to the main body 64 and electrically connected to the electrical connector 59 of the previous intermediate output module 56, and a circuit board 66 mounted in the main body 64 and electrically connected to the connector 65. In this embodiment the main body 64 is extruded or die cast from an aluminium alloy, but alternatively could be formed from an injection-moulded plastics material.

The main body 64 is of similar design to the main bodies 4 of the manifold modules 1 in including a cavity 67 which includes mounting means 68, in this embodiment recesses, for mounting the circuit board 66, with the circuit board 66 being secured within the cavity 67 by fixing means, preferably bolts, tapped screws or dowel pins.

The main body 64 further includes a fluid conduit 70 and first and second exhaust conduits 71, 72 which are in fluid communication with the respective ones of the fluid conduits 10 and the first and second exhaust conduits 11, 12 in the main bodies 4 of the manifold modules 1, and fluidly connected by a fluid supply line and exhaust lines to the respective fluid supply conduit 60 and exhaust conduits 61, 62 of the previous intermediate output module 56. In an alternative embodiment, each of the groups G1, G2, G3 of manifold modules 1 could be connected to separate fluid supply and exhaust lines.

The circuit board 66 includes an electrical connector 74, in this embodiment a four-pin male connector, for connection to the counterpart connector 18 of the circuit board 5 of the adjacent manifold module 1. The pins of the connector 74 provide a common ground line (0 V), a power line (+24 V), a serial signal input line and a serial signal output line. As mentioned hereinabove, where only one-way data communication from the control module 2 to the manifold modules 1 is required, then the connector 74 on the circuit board 66 and the connector 65 on the main body 64 need only have three sockets or pins.

Finally, it will be understood that the present invention has been described in its preferred embodiments and can be modified in many different ways without departing from the scope of the invention as defined by the appended claims.

In one modification, the control unit 34 of the control module 2 could be provided with additional processing capability to enable the generation of a pulse width modulated serial control signal upon receipt of differently formatted input signals, for example, digital signals.

In another modification, the return data from the manifold modules 1 could be transmitted over the same data line as the serial control signals using different time or frequency channels.

What is claimed is:

1. A modular fluid control system, comprising:

a control module for receiving parallel electronic control signals as a plurality of data streams, the control module including a control unit configured to convert the data streams of the parallel electronic control signals to serial electronic control signals, each including a plurality of data pulses as control instruction signals, and an electrical connector;

a plurality of valve modules, each valve module including at least one valve operable to control the flow of pressurised fluid; and a plurality of manifold modules connectable in series to the control module and connected to respective ones of the valve modules, each manifold module including a fluid supply conduit to provide a common manifold for receiving pressurised fluid, first and second electrical connectors for connection with ones of the connectors of adjacent manifold modules and the connector of the control module to provide an electrical bus for transmission of the serial control signals and power supply, and a control unit configured to decode one or more of the first-received data pulses of the serial control signals, control the respective valve module accordingly, and pass any remaining data pulses as a modified serial control signal from which the decoded data pulses have been one of removed or blocked to the control unit of any downstream manifold module.

2. The fluid control system of claim 1, wherein the manifold modules are non-addressed.

3. The fluid control system of claim 1, comprising a single group of series-connected manifold modules.

4. The fluid control system of claim 1, comprising a plurality of interconnected groups of series-connected manifold modules, and further comprising intermediate connection modules connected to the intermediate ends of the groups of manifold modules.

5. The fluid control system of claim 1, further comprising an end connection module connected to the end of the series-connected manifold modules.

6. The fluid control system of claim 5, wherein one of the control module or the end connection module includes a port for connection to a supply of pressurised fluid.

7. The fluid control system of claim 1, wherein the serial control signals are pulse width modulated signals.

8. The fluid control system of claim 7, wherein data pulses having different pulse widths designate different control states.

9. The fluid control system of claim 8, wherein the pulse widths are the active pulse widths.

10. The fluid control system of claim 1, wherein the control unit of each manifold module is further configured to operate the respective valve module only on consecutively receiving the one or more data pulses having the same pulse widths a predetermined number of times.

11. The fluid control system of claim 10, wherein the control unit of each manifold module is configured to operate the respective valve module only on consecutively receiving the one or more data pulses having the same pulse widths at least three times.

12. The fluid control system of claim 1, wherein the valve modules include one of mono-stable or bi-stable valves.

13. The fluid control system of claim 12, wherein the control unit of any manifold module connected to a valve module including a mono-stable valve is configured to decode the first-received data pulse of each of the received serial control signals.

14. The fluid control system of claim 12, wherein the control unit of any manifold module connected to a valve module including a bi-stable valve is configured to decode the first- and second-received data pulses of each of the received serial control signals.

15. The fluid control system of claim 1, wherein the control unit of the control module is further configured to terminate each of the serial control signals generated thereby with a termination signal to denote the end of each of the serial control signals.

16. The fluid control system of claim 1, wherein the control unit of each manifold module is further configured to transmit return data signals to the control module.

17. The fluid control system of claim 16, wherein the control unit of the control module is further configured to convert the return data signals to parallel return data signals.

18. The fluid control system of claim 1, wherein the control unit of each manifold module is configured to transmit return data signals to the control module on receipt of the termination signal.

19. The fluid control system of claim 1, wherein the manifold modules each comprise a body which includes a passage, and a printed circuit board housed in the passage which includes the connectors and the control unit, with the passages together defining a common passage in which the printed circuit boards are connected.

20. The fluid control system of claim 19, wherein the main body of each manifold module is formed as an integral component.

* * * * *